(12) United States Patent
Kosteva et al.

(10) Patent No.: US 8,792,475 B1
(45) Date of Patent: Jul. 29, 2014

(54) METHOD AND SYSTEM FOR PROVIDING PASS THROUGH WEB CONFIGURATION ON AN INTERNET PROTOCOL (IP) TELEPHONE

(75) Inventors: Glenn Kosteva, Westford, MA (US); Robert McGurrin, Arlington, MA (US); Michael McCormack, Gloucester, MA (US); Ronald Fowler, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1356 days.

(21) Appl. No.: 11/078,017

(22) Filed: Mar. 11, 2005

(51) Int. Cl.
*H04L 12/66* (2006.01)

(52) U.S. Cl.
USPC ........... 370/352; 370/351; 370/354; 370/389; 370/259; 455/414.1

(58) Field of Classification Search
CPC   H04M 1/2535; H04M 7/006; H04L 65/1069; H04L 12/66
USPC ........ 370/352, 351, 354, 389, 261, 259, 328; 455/411
See application file for complete search history.

(56) References Cited

U.S. PATENT DOCUMENTS

| | | | |
|---|---|---|---|
| 7,062,565 B1 * | 6/2006 | Ravindranath et al. | 709/229 |
| 2003/0156579 A1 * | 8/2003 | Cho | 370/352 |
| 2005/0180403 A1 * | 8/2005 | Haddad et al. | 370/352 |

* cited by examiner

*Primary Examiner* — Jamal Javaid

(57) ABSTRACT

Method and system for providing pass through web configuration on an IP telephone comprising the steps of establishing a data communication path in a data network, detecting a configuration parameter in the data communication path, extracting and also additionally, storing the detected configuration parameter, and performing a configuration procedure of an IP telephone associated with the configuration parameter operatively coupled to the data network is disclosed. The configuration parameter may include an Internet Protocol (IP) address, a key value pair associated with an IP address, or a valid communication address.

19 Claims, 4 Drawing Sheets

METHOD AND SYSTEM FOR PROVIDING PASS THROUGH WEB CONFIGURATION ON AN INTERNET PROTOCOL (IP) TELEPHONE

FIELD OF THE INVENTION

The present invention relates to internet protocol (IP) telephony. More specifically, the present invention relates to method and system for providing pass through web configuration on an IP telephone in a date network

BACKGROUND

With the increasing use of the internet as the medium for communication including voice communication, there exists a market for voice communication over the internet which is easy and simple to deploy in the existing data networks. As the speed of data transfer over the internet has increased rapidly, so too have applications which take advantage of the higher data transfer rate over the data networks.

For example, using a traditional dial up modem, a data transfer to permit voice communications has faced many technical challenges. With the mass deployment of broadband in consumer data networks over the internet as well as in corporate settings such as in Local Area Networks (LANs) or Wide Area Networks (WANs), communications requiring high speed data transfer is increasingly becoming a realistic tool for users.

In a typical data network (for example, in a corporate data network setting) deploying Voice over IP (Internet Protocol) telephones (hereinafter referred to as VOIP phones), VOIP phones generally are connected between a computer terminal at the location where the VOIP phone is situated, and the data network (for example, the corporate LAN). As such, data transfer between the computer terminal and the data network typically passes through the VOIP phone connected therebetween.

The initial setup procedures for VOIP phones in such data networks can be quite challenging. For example, in such data network environments, there are many automatic protocols that allow the configuration of each device that is connected to the respective data network. Otherwise, each device to function properly in the data network must be individually configured with the proper protocols, and the like. For example, a typical VOIP phone configuration procedure may include communicating with the DHCP (Dynamic Host Configuration Protocol) server service in the data network that functions to allocate the IP addresses and allows the advanced configuration of network settings such as DNS servers, for example. In this manner, the VOIP phone operating as a DHCL client, may automatically receive the IP address from the DHCP server which is configured to automatically assign the proper IP address for each DHCP client connected to the data network. In this manner, the various devices connected to the data network may communicate without substantial data collision or conflict issues.

Most if not all VOIP phones presently commercially available include a user interface display which can be used to configure the VOIP phone. For example, the VOIP phone includes various input command buttons (for example, a touch sensitive screen input pad, or traditional telephone buttons, to name a few) which, when operated, display the corresponding output command or result on the display unit of the VOIP phone to permit a user to properly configure the VOIP phone for use in the data network.

Unfortunately, the configuration of the VOIP phone to be operationally in the data network becomes very challenging, if not practically impossible, without the display screen on the VOIP phone. Indeed, by reviewing the input commands as well as the output commands shown in the display screen of the VOIP phone allows a user to confirm and verify the various protocols and input settings unique to the VOIP phone so as to be functional in the data network.

Therefore, it would be desirable to have a method and a system which would allow configuration of VOIP phones that do not have a display screen in a data network. Additionally, it would be desirable to have a method and a system which would allow configuration of the VOIP phones in an environment which does not include a DHCP server service that would assign the proper IP address to the VOIP phones in the data network.

SUMMARY OF THE INVENTION

In view of the foregoing, in accordance with one embodiment of the present invention, there is provided a method of performing configuration of an (Internet Protocol) IP telephone, comprising the steps of detecting a configuration parameter in a data communication path of a data network, extracting the detected configuration parameter, and initiating configuration procedure associated with the configuration parameter.

The configuration parameter may include one of an Internet Protocol (IP) address, a key value pair associated with an IP address, and a valid communication address.

The method in a further embodiment may include the step of establishing a data communication path between a computer terminal and a server terminal. Also, the method may additionally include the step of storing the extracted configuration parameter.

The step of initiating the configuration procedure in one embodiment may include transmitting a predetermined communications protocol associated with the data network, and validating a data communication path associated with the predetermined communications protocol, where the data for communication in the data communication path associated with the communications protocol may include voice data.

Additionally, the method in yet a further embodiment may also include extracting one or more IP addresses associated with a respective one or more IP telephone terminals in the data network, detecting a DHCP request from the respective one or more IP telephone terminals, and transmitting a corresponding respective one of the one or more IP addresses in response to the DHCP request.

In a further embodiment, the method may additionally include the step of storing the one or more IP addresses associated with the respective one or more IP telephone terminals in the data network.

A method of performing configuration of an Internet Protocol (IP) telephone in accordance with still another embodiment of the present invention includes establishing a data communication path in a data network, detecting a configuration parameter in the data communication path. extracting the detected configuration parameter, performing a configuration procedure of an IP telephone associated with the configuration parameter operatively coupled to the data network.

The configuration parameter may include one of an Internet Protocol (IP) address, a key value pair associated with an IP address, and a valid communication address, and the data communication path may be established between a computer terminal and a server terminal.

The method in a further embodiment may also include the step of storing the extracted configuration parameter.

Also, the step of performing the configuration procedure may, in a further embodiment, include transmitting a predetermined communications protocol associated with the IP telephone, and validating a voice data communication path between the IP telephone and the data network A system for configuring an Internet Protocol (IP) telephone in a data network, in accordance with yet another embodiment of the present invention, includes a data network, a computer terminal operatively coupled to the data network, and an Internet Protocol (IP) telephone terminal operatively coupled top the data network and the computer terminal, where the IP telephone terminal is configured to detect a configuration parameter in a data communication path between the computer terminal and the data network, extract the detected configuration parameter, and initiate a configuration procedure associated with the configuration parameter.

The configuration parameter may include one of an Internet Protocol (IP) address, a key value pair associated with an IP address, and a valid communication address.

Further, the IP telephone terminal may be configured to store the extracted configuration parameter.

Moreover, the IP telephone terminal may further be configured to transmit a predetermined communications protocol associated with the data network, and to validate a data communication path associated with the predetermined communications protocol.

The data for communication in the data communication path associated with the communications protocol may include voice data.

The IP telephone terminal may be further configured to extract one or more IP addresses associated with a respective one or more IP telephone terminals in the data network, detect a DHCP request from the respective one or more IP telephone terminals, and transmitting a corresponding respective one of the one or more IP addresses in response to the DHCP request.

Also, the IP telephone terminal may be further configured to store the one or more IP addresses associated with the respective one or more IP telephone terminals in the data network.

A system for performing configuration of an Internet Protocol (IP) telephone in accordance with still another embodiment of the present invention includes a data network, a plurality of computer terminals each operatively coupled to the data network, a plurality of IP telephone terminals, each operatively coupled to the data network and to a respective one of the plurality of the computer terminals, where one of the plurality of the IP telephone terminals is configured to detect a configuration parameter in the data communication path between the respective one of the plurality of computer terminals associated with the one of the plurality of the IP telephone terminals and the data network, extract the detected configuration parameter, and perform a configuration procedure of the one of the plurality of the IP telephone terminals associated with the configuration parameter.

The configuration parameter may include one of an Internet Protocol (IP) address, a key value pair associated with an IP address, and a valid communication address The one of the plurality of the IP telephone terminals may be further configured to store the extracted configuration parameter.

The one of the plurality of the IP telephone terminals may be further configured to transmit a predetermined communications protocol associated with the one of the plurality of the IP telephone terminal, and to validate a voice data communication path between the one of the plurality of the IP telephone terminals to the data network.

These and other features and advantages of the present invention will be understood upon consideration of the following detailed description of the invention and the accompanying drawings.

DETAILED DESCRIPTION

Figure 1:
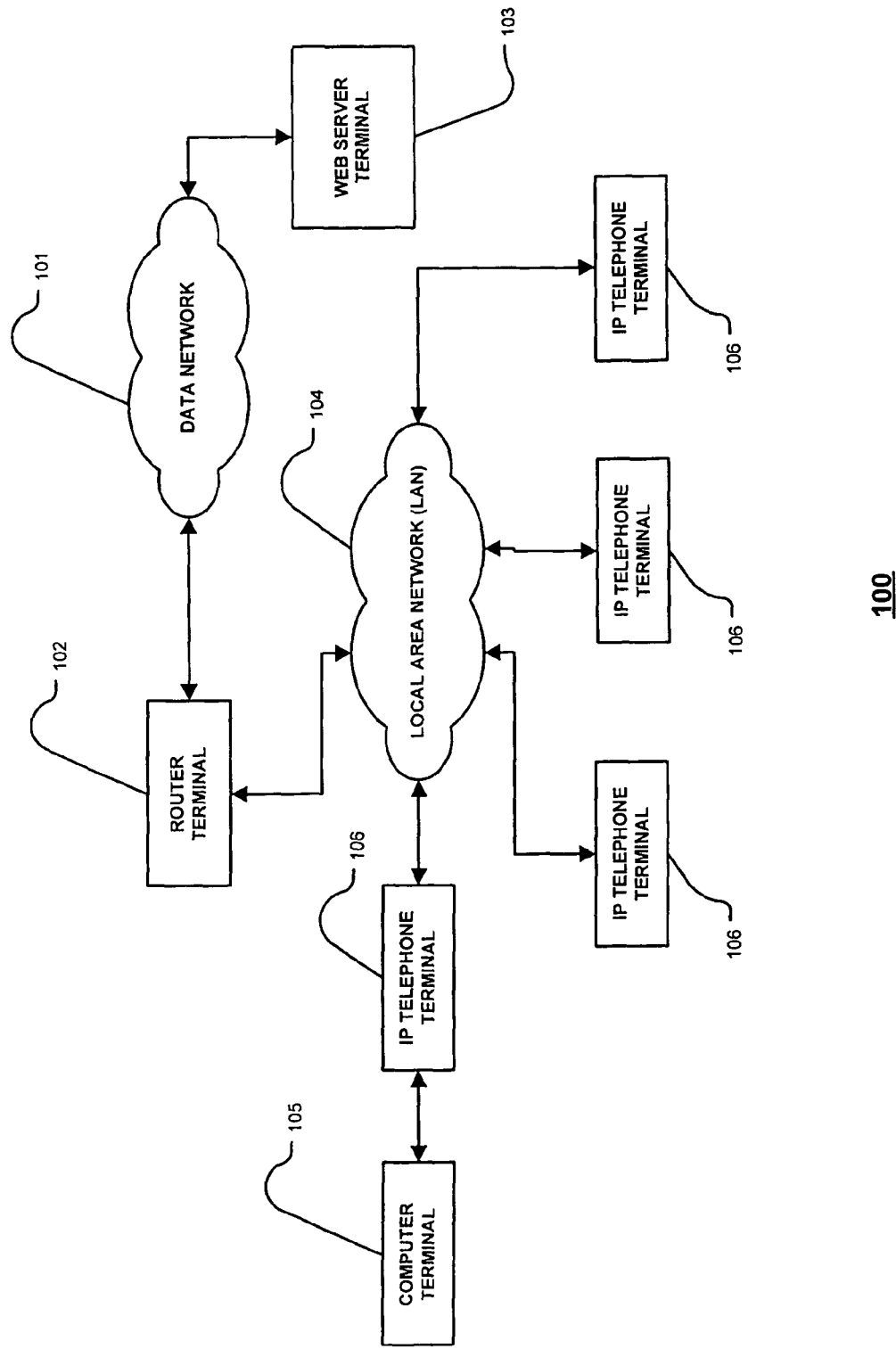
FIG. 1 illustrates a data network for practicing the pass through web configuration of VOIP phones in accordance with one embodiment of the present invention.

FIG. 1 illustrates a data network for performing the pass through web configuration of VOIP phones in accordance with one embodiment of the present invention. Referring to the Figure, in one embodiment, there is provided a data network 101 which operatively couples a web server terminal 103 and a router terminal 102. The router terminal 102 as shown in the figure is further operatively coupled to a local area network (LAN) 104. Also shown in the Figure is a plurality of IP telephone terminals 106 each operatively coupled to the LAN 104.

By way of an example, there is also shown in the Figure, a computer terminal 105 which is operatively coupled to one of the plurality of the IP telephone terminals 106. While only one computer terminal 105 is shown in FIG. 1, within the scope of the present invention, each of the IP telephone terminals 106 may be coupled to a respective one of a plurality of computer terminals 105, and further, wherein each of the IP telephone terminals 106 being also connected to the LAN 104.

In this manner, in accordance with one embodiment of the present invention, the data communication path may be established from the computer terminal 105 via the IP telephone terminal 106 to the LAN 104, which then establishes the data communication path via the router terminal 102 over the data network 101 to the web server terminal 103. In one embodiment, the web server terminal 103 may reside in any location within the data network 101. Indeed, as long as the router terminal 102 firewall permits the address corresponding to the web server terminal 103, the web server terminal may reside in any location in the data network 101 for example, at a customer site, or at a corporate headquarters.

In one embodiment, the data network may be the internet or any other data network which would allow data communication from various terminals. Furthermore, the LAN 104 may include a corporate inhouse data network, for example, which has several degrees of data security configured therein. Alternatively, within the scope of the present invention, the LAN 104 may include other such predefined data networks such as Wide Area Network (WAN), a Metropolitan Area Network (MAN), a Wireless Area Network, and the like. Moreover, within the scope of the present invention, the IP telephone terminal 106 may similarly be operatively coupled to the wide area network, the metropolitan area network, and the wireless area network so as to be configured for operation as a voice communication device over the respective network.

Referring back to FIG. 1, the connections to and from the LAN 104, and the connections to and from the data network 101 may include one or more of a wired connection such as an Ethernet cable connection, and a wireless connection using, for example, 801.11 g, 801.11b, 801.11a, Bluetooth, IrDA, or any other wireless communication protocol.

As will be described in further detail, in one embodiment of the present invention, the IP telephone terminal 106 may be configured such that when connected to the LAN 104, the IP telephone terminal 106 is configured to identify the valid communication address for this IP telephone terminal 106 in the data communication path between the computer terminal 105 and the LAN 104 and ultimately the web server terminal 103 which is communicating with the computer terminal 105. In one embodiment, the IP telephone terminal 106 may be preprogrammed to detect the valid communication address specific and unique to the IP telephone terminal 106. This may be programmed into the IP telephone terminal 106 at the time of manufacture, for example.

Accordingly, in one embodiment, the web server terminal 103 may be configured to establish a webpage with a fixed IP address (i.e., the valid communication address) which the IP telephone terminal 106 is configured to identify, or alternatively, the web server terminal 103 may be configured to set up a key-value pair on a webpage which the IP telephone terminal 106 is configured to recognize. For example, the valid communication address (i.e., the assigned IP address for the VOIP phone) may be associated with a field such as "setup_local_phone_ip_address", which the IP telephone terminal 106 is configured to recognize as the field which has associated therewith the valid communication address.

In this manner, as discussed in further detail below, the present invention in accordance with the various embodiments allows the VOIP phones without a display screen or a DHCP server issuing IP addresses for terminals and devices in the data network, to properly configure the VOIP phone for voice communication over the data network.

Moreover, it one embodiment of the present invention, data not associated with the initialization, configuration and operational functions of the IP telephone terminal 106 are passed through the telephone terminal 106 such that the data communication path between the computer terminal 105 and the data network 101 is relatively unencumbered.

Figure 2:
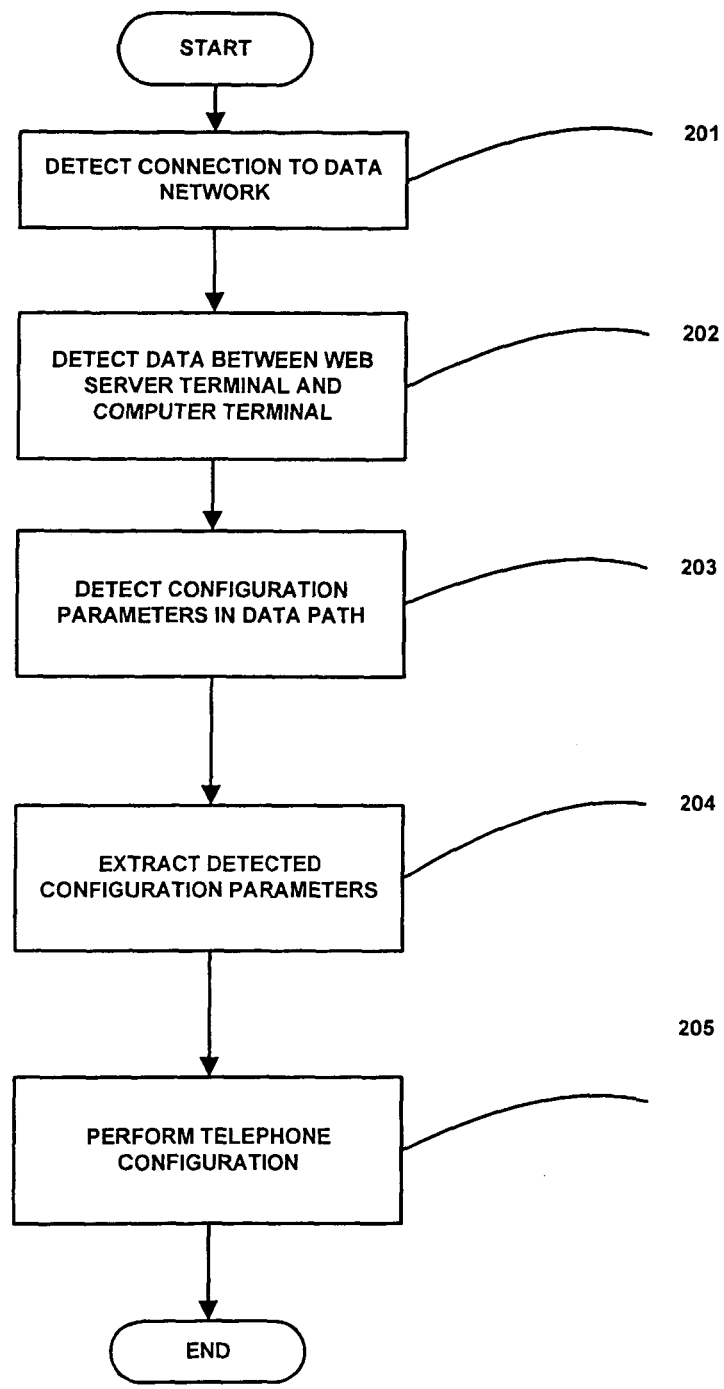
FIG. 2 is a flowchart illustrating the pass through web configuration of a VOIP phone in accordance with one embodiment of the present invention.

FIG. 2 is a flowchart illustrating the pass through web configuration of a VOIP phone in accordance with one embodiment of the present invention. Referring to FIGS. 1 and 2, at step 201, the IP telephone terminal 106 is configured to detect a data connection to the data network 101 (for example, via the LAN 104 and the router terminal 102). Thereafter, the IP telephone terminal 106 at step 202 detects data flow between the web server terminal 103 and the computer terminal 105. The IP telephone terminal 106 in one embodiment is configured to pass through the data between the computer terminal 105 and the web server terminal 103 such that the computer terminal 105 may communicate with the web server terminal 103 via the data communication path through the IP telephone terminal 106. The IP telephone terminal 106 may be configured in one embodiment such that data unrelated to the operational or configuration functions of the IP telephone terminal 106 is not hindered and passed through the IP telephone terminal 106.

Referring to FIG. 2, in the case where the IP telephone terminal 106 detects at step 203 the configuration parameters relevant to the configuration settings of the IP telephone terminal 106 in the data communication path between the computer terminal 106 and the web server terminal 103, then at step 204, the IP telephone terminal 106 is configured to extract the detected configuration parameters, and thereafter initiate the configuration procedure at step 205, for example, by implementing the extracted configuration parameters. In one embodiment, other configuration parameters may include SubNetMask, GatewayIP, NCP IP (call processor) or a key code or an access code associated with a security setting.

In one embodiment, the detected configuration parameters may include one of a valid communication address for the IP telephone terminal 106 and a key value pair associated with the valid communication address for the IP telephone terminal 106.

In a further embodiment, a user at the computer terminal 105 may prompt the web server terminal 103 to issue a valid communication address for the IP telephone terminal 106 connected to the computer terminal 105. In this case, the computer terminal 105 may transmit a query or a command to the web server terminal 103 to request a valid communication address for the IP telephone terminal 106 connected thereto, so as to allow configuration of the IP telephone terminal 106 over the data network 101.

Indeed, in this manner, the IP telephone terminal 106 may be configured without the use of a display screen to allow user interface during the configuration process of the IP telephone terminal 106.

Figure 3:
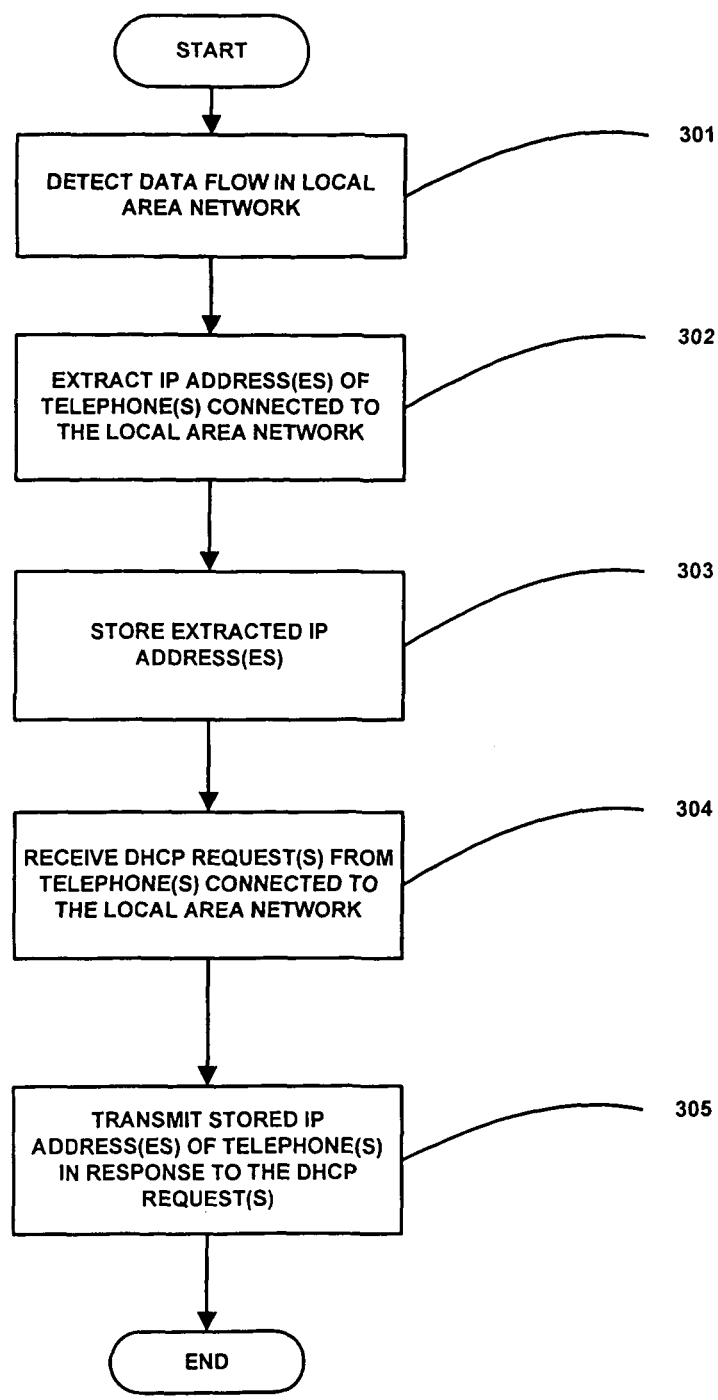
FIG. 3 is a flowchart illustrating the pass through web configuration of multiple VOIP phones in accordance with another embodiment of the present invention.

FIG. 3 is a flowchart illustrating the pass through web configuration of multiple VOIP phones in accordance with another embodiment of the present invention. Referring to the Figure, at step 301, the IP telephone terminal 106 is configured to detect data flow in the LAN 104 as between the computer terminal 105 and the web server terminal 103 via the router terminal 102 over the data network 101. In one embodiment, the IP telephone terminal 106 may be configured to detect the http packet exchanges between the computer terminal 105 and the web server terminal 103 at step 301.

Referring back to FIG. 3, thereafter at step 302, the IP telephone terminal 106 may be configured to extract the IP addresses of the other IP telephone terminals 106 connected to the LAN 104 from the data communication path as between the computer terminal 105 and the web server terminal 103. In one embodiment, this may be implemented as a manufacture setting where the IP address detection setting and features may be programmed or configured into the IP telephone terminal 106. Then at step 303, the IP telephone terminal 106 may be configured to store the extracted IP addresses from the data flow between the computer terminal 105 and the web server terminal 103.

Referring again to FIG. 3, after having stored the extracted IP addresses corresponding to the IF telephone terminals 106 connected to the LAN 104, at step 304 the IP telephone terminal 106 may be configured to receive a DHCP request from one of the other IP telephone terminals 106 connected to the LAN 104. Thereafter, in response to the received DHCP request, the IP telephone terminal 106 which has stored the IP addresses may be configured to transmit the stored IP address to the respective IP telephone terminal 106 which had transmitted the DHCP request.

In this manner, in accordance with one embodiment of the present invention, in a non-DHCP environment, the IP telephone terminal 106 which has stored the IP addresses of the other IP telephone terminals 106 may effectively function as a DHCP server with respect to the DHCP request transmitting IP telephone terminals 106. Furthermore, the DHCP request transmitting IP telephone terminals 106 may then proceed with the configuration procedure to be configured in the data network 101 for voice communication.

Figure 4:
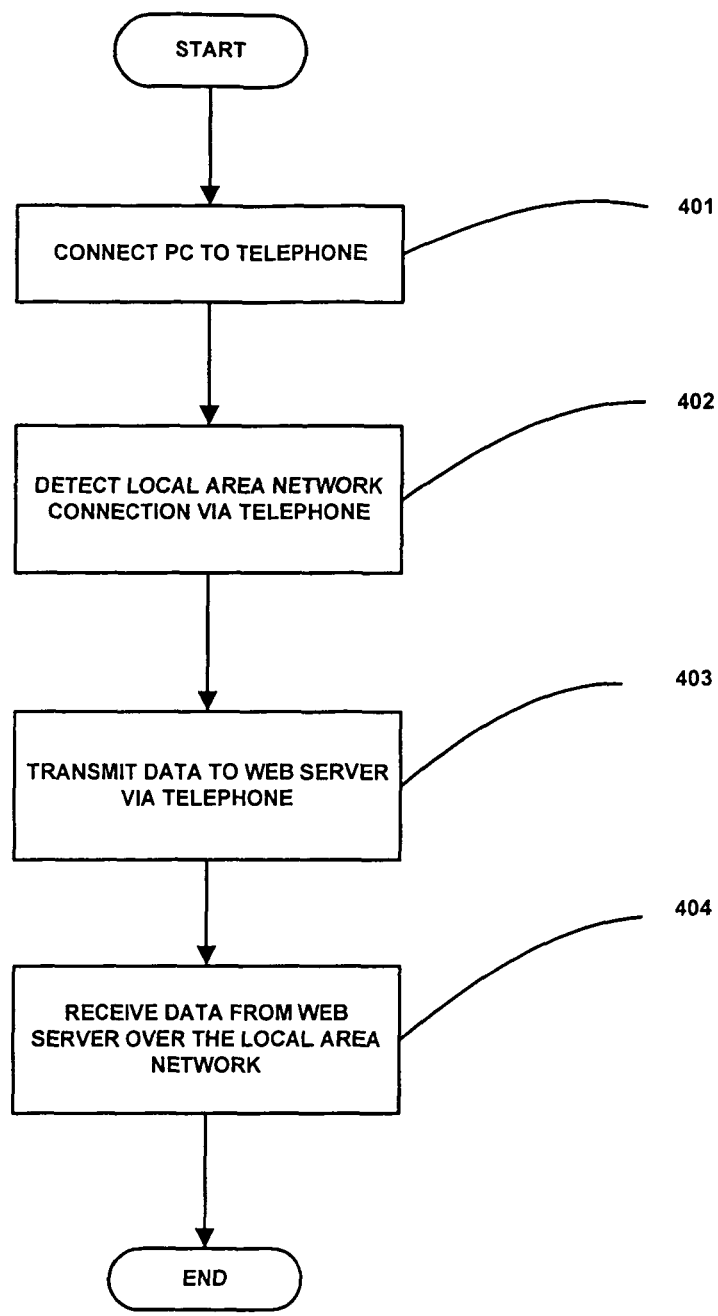
FIG. 4 is a flowchart illustrating the pass through web configuration of VOIP phones in accordance with yet another embodiment of the present invention.

FIG. 4 is a flowchart illustrating the pass through web configuration of VOIP phones in accordance with yet another embodiment of the present invention. More specifically, FIG. 4 illustrates the pass through web configuration of the IP telephone terminal 106 at the computer terminal 105 connected to the IP telephone terminal 106. Referring to the Figure, at step 401, the computer terminal 105 is connected to the IP telephone terminal 106 using, for example, an Ethernet cable connection, a wireless connection and the like.

Thereafter at step 402, with the connection of the IP telephone terminal 106 established with the computer terminal 105, the computer terminal 105 detects the connection of the IP telephone terminal 106 to the LAN 104 (for example, via an Ethernet cable connect to a wall jack, or a wireless connection). In this manner, the computer terminal 105 is operatively connected to the LAN 104 via the IP telephone terminal 106.

Referring back to FIG. 4, at step 403, the user may transmit data to the web server terminal 103 over the LAN 103 connection via the IP telephone terminal 106. For example, in one embodiment, the user at the computer terminal 105 may transmit to the web server terminal 103 a request for configuration parameters for the IP telephone terminal 106. In one aspect, this may include directing the web browser on the computer terminal 105 so as to be directed to the web server terminal 103.

Thereafter at step 404, the computer terminal 105 receives data from the web server terminal 103 over the LAN 104, which is also passed through the IP telephone terminal 106. In this manner, in one embodiment of the present invention, the IP telephone terminal 106 may be configured to "see" the data passing between the web server terminal 103 and the computer terminal 105, and detect the configuration parameters (for example, the IP address on the data network 101) for the IP telephone terminal 106. In this manner, in one embodiment of the present invention, the computer terminal 105 may be used to configure the IP telephone terminal 106 to set up for voice communication where the IP telephone terminal 106 does not include a display screen as user interface. Additionally, within the scope of the present invention the computer terminal 105 may be configured to provide encryption functions for security.

In the manner described above, in accordance with the various embodiments of the present invention, there is provided a method an system for performing pass through web configuration of VOIP phones which do not have a display screen (thus resulting in, for example, smaller, more compact design). Additionally, by configuring a VOIP phone in the data network to function as a DHCP server, in a non-DHCP environment, it is still possible to configure the VOIP phones to function as voice communication devices.

Additionally, the various embodiments of the present invention described herein have the advantages of not requiring additional software to be loaded onto the computer terminal 105 (FIG. 1), and further, it is possible to leverage the existing web server configuration techniques to perform the initial VOIP configurations in the data network.

The various processes described above including the processes performed by the IP telephone terminals 106 and the computer terminal 105 in the software application execution environment in the data network 100 including the processes and routines described in conjunction with FIGS. 2-4, may be embodied as computer programs developed using an object oriented language that allows the modeling of complex systems with modular objects to create abstractions that are representative of real world, physical objects and their inter-relationships. The software required to carry out the inventive process, which may be stored in the memory (not shown) of the IP telephone terminals 106 and the computer terminal 105, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of operating an (Internet Protocol) IP telephone, comprising:
   detecting, by the IP telephone, a data communication between a computer terminal and a server terminal, wherein the computer terminal is in communication with the server terminal through the IP telephone;
   determining whether a configuration parameter associated with the IP telephone is included in the data communication;
   in response to a determination that the configuration parameter is included in the data communication, extracting, by the IP telephone, the configuration parameter and initiating a configuration procedure associated with the configuration parameter at the IP telephone; and
   in response to a determination that the configuration parameter is not included in the data communication, passing the data communication between the computer terminal and the server terminal through the IP telephone,
   wherein the IP telephone is to function as a Dynamic Host Configuration Protocol (DHCP) server.

2. The method of claim 1, wherein the configuration parameter includes one of an Internet Protocol (IP) address of the IP telephone, a key value pair associated with the IP address of the IP telephone, and a valid communication address.

3. The method of claim 1, wherein the method further includes establishing a data communication path between the computer terminal and the server terminal.

4. The method of claim 1, further including storing the extracted configuration parameter.

5. The method of claim 1, wherein initiating the configuration procedure includes:
   transmitting a predetermined communications protocol associated with a data network; and
   validating a data communication path associated with the predetermined communications protocol.

6. The method of claim 5, wherein the data communication in the data communication path associated with the communications protocol includes voice data.

7. The method of claim 1, further including:
   extracting an IP address of another IP telephone;
   detecting a Dynamic Host Configuration Protocol (DHCP) request from the another IP telephone; and
   transmitting the extracted IP address in response to the DHCP request to the another IP telephone.

8. The method of claim 7, further including storing the extracted IP address of the another IP telephone.

9. A method of operating an (Internet Protocol) IP telephone, comprising:

establishing, by the IP telephone, a data communication path between a computer terminal and a server terminal, wherein the computer terminal is in communication with the server terminal through the IP telephone;

detecting, by the IP telephone, a data communication between the computer terminal and the server terminal;

determining, by the IP telephone, whether a configuration parameter for the IP telephone is included in the data communication;

in response to a determination that the configuration parameter for the IP telephone is included in the data communication, extracting the configuration parameter and performing a configuration procedure on the IP telephone associated with the configuration parameter;

in response to a determination that the configuration parameter for the IP telephone is not included in the data communication, passing the data communication between the computer terminal and the server terminal through the IP telephone, wherein the IP telephone is to function as a Dynamic Host Configuration Protocol (DHCP) server.

10. The method of claim 9, wherein the configuration parameter includes one of an Internet Protocol (IP) address of the IP telephone, a key value pair associated with the IP address of the IP telephone, and a valid communication address.

11. The method of claim 9, further including:
extracting an IP address of another IP telephone;
detecting a Dynamic Host Configuration Protocol (DHCP) request from the another IP telephone; and
in response to the DHCP request, transmitting the extracted IP address to the another IP telephone.

12. The method of claim 9, wherein performing the configuration procedure includes:
transmitting a predetermined communications protocol associated with the IP telephone; and
validating a voice data communication path between the IP telephone and a network.

13. An Internet Protocol (IP) telephone terminal comprising:
a processor; and
a memory storing machine readable instructions to cause the processor to:
establish a data communication path between a computer terminal and a server terminal, wherein the computer terminal is in communication with the server terminal through the IP telephone terminal;
detect a data communication between the computer terminal and the server terminal,
determine whether a configuration parameter for the IP telephone terminal is included in the data communication,
in response to a determination that the configuration parameter for the IP telephone terminal is included in the data communication, extract the configuration parameter, and initiate a configuration procedure associated with the configuration parameter,
in response to a determination that the configuration parameter for the IP telephone is not included in the data communication, pass the data communication between the computer terminal and the server terminal through the IP telephone
wherein the IP telephone is to function as a Dynamic Host Configuration Protocol (DHCP) server.

14. The IP telephone terminal of claim 13, wherein the configuration parameter includes one of an Internet Protocol (IP) address of the IP telephone terminal, a key value pair associated with the IP address of the IP telephone terminal, and a valid communication address.

15. The IP telephone terminal of claim 13, wherein the machine readable instructions are to cause the processor to store the extracted configuration parameter.

16. The IP telephone terminal of claim 13, wherein the machine readable instructions are further to cause the processor to transmit a predetermined communications protocol associated with a data network, and to validate a data communication path associated with the predetermined communications protocol.

17. The IP telephone terminal of claim 16, wherein the data communication in the data communication path associated with the communications protocol includes voice data.

18. The IP telephone terminal of claim 13, wherein the machine readable instructions are further to cause the processor to extract an IP address of another IP telephone terminal in a data network, detect a Dynamic Host Configuration Protocol (DHCP) request from the another IP telephone terminal, and transmit the extracted IP address in response to the DHCP request to the another IP telephone terminal.

19. The IP telephone terminal of claim 18, wherein the machine readable instructions are further to cause the processor to store the extracted IP address of the another IP telephone terminal.

* * * * *